Sept. 29, 1959  J. S. HOEKSTRA ET AL  2,905,987
SHELL MOLD APPARATUS
Filed Feb. 13, 1956
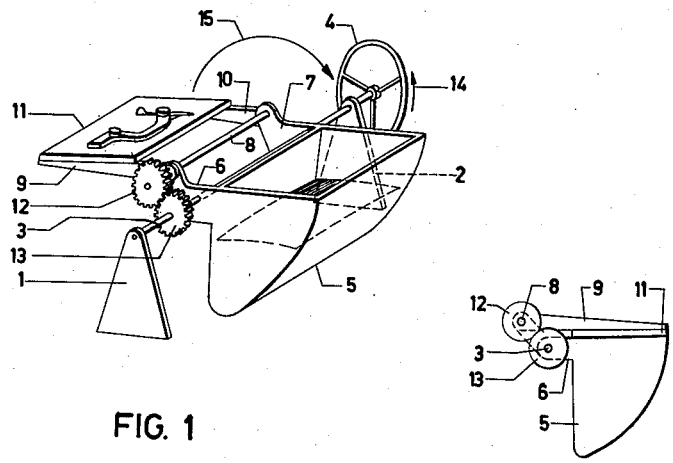
FIG. 1
FIG. 2
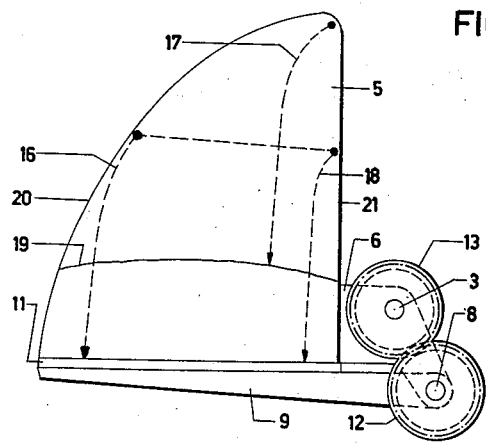
FIG. 3

2,905,987
Patented Sept. 29, 1959

2,905,987
SHELL MOLD APPARATUS

Jacob S. Hoekstra, Noordwijkerhout, and Henricus J. M. Verschure, Amsterdam, Netherlands Application February 13, 1956, Serial No. 565,222

Claims priority, application Netherlands February 25, 1955

3 Claims. (Cl. 22—9)

This invention relates to a device for the manufacture of shells for the shell moulding process. Essentially, the device comprises a movable container open at the top for receiving an amount of material from which the shells are to be made and a pattern plate provided with actuating means for moving it towards and from opening of said container, the said pattern plate and the container being arranged in such a manner and such actuating means being provided in such a way that the plane in which the moulding plate closes the opening of the container first moves in its entirety upwards and thereafter downwards until said pattern plate and said container together come to a standstill in a predetermined reversed position.

In known devices of this type the container, which is partly filled in the usual way with the material for the manufacture of shells, is everywhere of the same cross-section as regards its portion above said material. This entails the disadvantage that, once the container suddenly comes to a standstill after a quick rotation of the container, the material will slide downwards along the container wall remotest from the middle plane between the ultimate positions of the container, whereas when rotating the container slowly it will glide downwards along the container wall nearest to said middle plane so that consequently this material is not only subjected to a braking action but, moreover, it is not distributed on the pattern plate in a sufficiently uniform manner. All this entails the disadvantage that the material does not sufficiently arrive behind or in front of projecting portions of the pattern plate thus producing the so-called shadow effect.

The present invention avoids this disadvantage in that at least the container wall of the device remotest from the middle plane between the ultimate positions of said container is so designed that the distance from said container wall to said middle plane increases from the bottom part towards the opening of said container. This offers the advantage of a very simple device in which no braking action is exercised on the moulding material so that this material may hit the pattern plate with high velocity. Consequently shells are obtained which accurately correspond with the pattern plate and complicated moulds are manufactured without the production of shadow effects.

The means for controlling this device is characterized in that the container is actuated with such a velocity that the container wall remotest from the middle plane between the ultimate positions of the container is located outside the trajectories of the material in the container when said material is thrown towards the pattern plate.

The invention will be described below with reference to the acompanying drawings showing by way of example an embodiment of the device according to the invention;

Fig. 1 is a perspective view of the device in its initial position;

Fig. 2 is a side elevational view thereof in its intermediate position with the container being closed by the pattern plate, and, Fig. 3 is an enlarged side elevational view of the container in its final position.

The device shown in the drawing comprises a frame 1, 2 in which a driving shaft 3 may be rotated with the aid of a driving wheel 4, for example a hand wheel, fixedly mounted thereon. A container 5, which is partly filled with material from which the shells are made, is rotatably mounted on this shaft 3. This container is provided with projections 6, 7 in which a second shaft 8 is rotatably mounted.

On this second shaft pattern plate holders 9, 10 are fixedly arranged. These pattern plate holders carry a pattern plate 11. Further a gear 12 is fixedly mounted on the shaft 8, said toothed wheel being in engagement with the gear 13 fixedly mounted on the driving shaft 3.

When the hand wheel 4 is actuated in the direction of the arrow 14, the pattern plate 11 is rotated by the gears 12 and 13 in the direction of the arrow 15 until the pattern plate has closed the opening of the container 5. The device then assumes the position shown in Fig. 2 in which the pattern plate 11 and the container 5 are coupled with the shaft 3 by means of the gears 12 and 13 and the pattern plate holders 9 and 10.

When the rotation of the hand wheel 4 is continued in the direction of the arrow 14, the plane in which the pattern plate 11 closes the container opening first swings in its entirety upwards and thereafter downwards. During the upward movement of the container 5 the material contained therein remains in the lower portion of the container. When the container thereafter moves downwards, the material will likewise move downwards, so that, when the pattern plate is in or near the final position shown in Fig. 3, the said material is strongly thrown against the pattern plate 11 and consequently all contours of the latter come well into contact with the material from which the shell is to be moulded. In Fig. 3 some trajectories followed by the material are indicated by dotted lines 16, 17, 18. The material then comes to rest on the pattern plate in the final position approximately according to the full line 19.

In order to prevent the material from being braked by the container walls when the said material moves towards the pattern plate, the container walls 20 and 21 are so arranged that they recede in respect of the trajectory of this material.

The throw effect obtained by the invention offers the advantage that the container may have much smaller dimensions than in the case of a device in which the material hits the pattern plate only as a result of a free fall. It should be stated that the side walls practically do not exert a braking action on the material so that these side walls need not recede in respect of the trajectory of the material.

We claim:
1. A device for the manufacture of shells for the shell moulding process, comprising a frame having a pair of spaced apart, confronting supports, a driving shaft rotatably journalled in and extending between the supports, a container having an open top, opposing main walls and opposing side walls, said side walls having substantially planar extensions formed adjacent the top and extending beyond one of the main walls, said extensions being rotatably mounted adjacent the main wall on said driving shaft, a second shaft rotatably mounted in the extensions and disposed parallel to the driving shaft, drive transmitting means connected between said shafts, a pattern plate having supports fixed on the second shaft, so that when driving the driving shaft the pattern plate first closes the container whereafter the plane in which the pattern plate closes the opening of the container moves in its entirety upwards and thereafter downwards until said pattern plate and said container together come to a standstill in a predetermined position, at least the main wall of the container remotest from the middle plane between the ultimate positions of said container being so designed that the distance from said container wall to said middle plane increases from the bottom part until the opening of said container.

2. A device for the manufacture of shells for the shell moulding process, comprising a frame having a pair of spaced apart, confronting supports, a driving shaft rotatably journalled in and extending between the supports, a container having an open top, opposing main walls and opposing side walls, said side walls having substantially planar extensions formed adjacent the top and extending beyond one of the main walls, said extensions being rotatably mounted adjacent the main wall on said driving shaft, a second shaft rotatably mounted in the extensions and disposed parallel to the driving shaft, drive transmitting means connected between said shafts, a pattern plate having supports fixed on the second shaft so that when driving the driving shaft the pattern plate first closes the container whereafter the plane in which the pattern plate closes the opening of the container moves in its entirety upwards and thereafter downwards until said pattern plate and said container together come to a standstill in a predetermined position, at least the main wall of the container remotest from the middle plane between the ultimate positions of said container being so designed that the distance from said container wall to said middle plane progressively increases from the bottom part towards the opening of said container.

3. A device for the manufacture of shells for the shell moulding process, comprising a frame having a pair of spaced apart, confronting supports, a driving shaft rotatably journalled in and extending between the supports, a container having an open top, opposing main walls and opposing side walls, said side walls having substantially planar extensions formed adjacent the top and extending beyond one of the main walls, said extensions being rotatably mounted adjacent the main wall on said driving shaft, a second shaft rotatably mounted in the extensions and disposed parallel to the driving shaft, drive transmitting means connected between said shafts, a pattern plate having supports fixed on the second shaft, one of said main walls being flat and disposed close to and at right angles to the axis of rotation and the other main wall being furthest from the driving shaft and being arcuate and extending from the top in spaced relation with the one main wall to the bottom where it contacts the one main wall and defines the bottom wall of the container.

References Cited in the file of this patent

The Foundry, "New Equipment," volume 81, Issue 11, page 254, pub. November 1953.

Foundry Trade Journal, "Some Aspects of Shell-Molding Technique," pages 631–637, June 3, 1954. Page 633, right column only, of interest.